(12) United States Patent
Egan

(10) Patent No.: US 9,393,885 B2
(45) Date of Patent: Jul. 19, 2016

(54) COMPACT MULTI-MOTION LIFTING AND TRANSFERRING APPARATUS AND METHOD OF OPERATING SAME

(76) Inventor: Thomas F. Egan, Binghamton, NY (US)

( * ) Notice: Subject to any disclaimer, the term of this patent is extended or adjusted under 35 U.S.C. 154(b) by 203 days.

(21) Appl. No.: 13/137,244

(22) Filed: Jul. 29, 2011

(65) Prior Publication Data

US 2012/0091772 A1 Apr. 19, 2012

Related U.S. Application Data

(60) Provisional application No. 61/344,489, filed on Aug. 5, 2010.

(51) Int. Cl.
| | |
|---|---|
| *B60N 2/07* | (2006.01) |
| *B60N 2/24* | (2006.01) |
| *B60N 2/14* | (2006.01) |
| *A61G 3/06* | (2006.01) |
| *B60N 2/02* | (2006.01) |
| *B60N 2/06* | (2006.01) |

(52) U.S. Cl.
CPC ............... *B60N 2/245* (2013.01); *A61G 3/062* (2013.01); *B60N 2/0232* (2013.01); *B60N 2/06* (2013.01); *B60N 2/0742* (2013.01); *B60N 2/14* (2013.01); *B60N 2/146* (2013.01)

(58) Field of Classification Search
CPC ........ B60P 1/4428; B60N 2/14; B60N 2/146; B60N 2/245; B60N 2/0742; A61G 3/062
USPC ......... 414/539, 541, 921, 543; 296/65.01, 63, 296/65.04, 65.08, 65.11, 65.06; 297/344.13, 344.12, 344.15, 256.12, 297/344.21, 344.22; 5/81.1 RP, 87.1; 187/200
See application file for complete search history.

(56) References Cited

U.S. PATENT DOCUMENTS

| | | | |
|---|---|---|---|
| 360,578 A | 4/1887 | Francis | |
| 2,792,951 A | 5/1957 | White | |
| 2,864,431 A * | 12/1958 | Eaton | ............................ 248/393 |
| 3,147,994 A * | 9/1964 | Lapine | ....................... 296/65.12 |
| 3,516,559 A | 6/1970 | Walter | |
| 3,710,962 A | 1/1973 | Fowler, Jr. | |
| 3,794,381 A * | 2/1974 | Caldemeyer | ............. 297/423.22 |
| 3,896,946 A | 7/1975 | Forsyth et al. | |
| 4,015,725 A | 4/1977 | Ryan et al. | |

(Continued)

FOREIGN PATENT DOCUMENTS

| | | |
|---|---|---|
| DE | 3123546 | 1/1983 |
| GB | 2322352 | 8/1998 |

(Continued)

OTHER PUBLICATIONS

Bruno Independent Living Aids, Inc., Operator/Installation Manual; 2001.

*Primary Examiner* — Glenn Myers

(57) ABSTRACT

A compact multi-motion lifting and transferring apparatus and a method of operating same are disclosed. In one particular embodiment, the apparatus may comprise an intermediary support member configured to be rotated about a substantially vertical axis, an electrically or hydraulically powered up/down extension arm, a support member for supporting a seat for accommodating at least one person, and a latching mechanism for securing the seat and seat support mechanism in a fully stowed position suitable for traveling in a vehicle.

19 Claims, 4 Drawing Sheets

(56) References Cited

U.S. PATENT DOCUMENTS

| | | | | |
|---|---|---|---|---|
| 4,075,719 A | | 2/1978 | Sullivan | |
| 4,096,955 A | | 6/1978 | Dake | |
| 4,133,437 A | * | 1/1979 | Gates | 414/541 |
| 4,140,230 A | | 2/1979 | Pearson | |
| 4,142,641 A | | 3/1979 | Dake | |
| 4,170,368 A | | 10/1979 | Southward | |
| 4,226,567 A | | 10/1980 | Van Orsdale, Jr. | |
| 4,270,630 A | | 6/1981 | Karkau | |
| 4,306,634 A | | 12/1981 | Sangster | |
| 4,365,924 A | | 12/1982 | Brigman et al. | |
| 4,398,858 A | | 8/1983 | Paffrath | |
| 4,406,574 A | | 9/1983 | Riley | |
| 4,420,286 A | | 12/1983 | Hanson et al. | |
| 4,438,640 A | | 3/1984 | Willis | |
| 4,458,870 A | | 7/1984 | Duncan et al. | |
| 4,479,753 A | * | 10/1984 | Thorley | 414/541 |
| 4,483,653 A | | 11/1984 | Waite | |
| 4,545,085 A | | 10/1985 | Feldt | |
| 4,551,060 A | | 11/1985 | Quercy | |
| 4,569,094 A | | 2/1986 | Hart et al. | |
| 4,573,854 A | | 3/1986 | McFarland | |
| 4,605,132 A | | 8/1986 | Van Seumeren | |
| 4,616,972 A | | 10/1986 | McFarland | |
| 4,644,595 A | | 2/1987 | Daniel | |
| 4,659,276 A | | 4/1987 | Billett | |
| 4,661,035 A | | 4/1987 | Danielsson | |
| 4,664,584 A | | 5/1987 | Braun et al. | |
| 4,671,729 A | | 6/1987 | McFarland | |
| 4,685,860 A | | 8/1987 | McFarland | |
| 4,786,072 A | | 11/1988 | Girvin | |
| 4,797,042 A | | 1/1989 | McFarland | |
| 4,801,237 A | | 1/1989 | Yamamoto | |
| 4,808,056 A | | 2/1989 | Oshima | |
| 4,809,998 A | | 3/1989 | Girvin | |
| 4,941,216 A | * | 7/1990 | Boublil | 4/496 |
| 4,955,779 A | | 9/1990 | Knackstedt | |
| 4,974,766 A | | 12/1990 | DiPalma et al. | |
| 5,022,106 A | | 6/1991 | Richards | |
| 5,035,467 A | | 7/1991 | Axelson et al. | |
| 5,040,832 A | | 8/1991 | Zalewski | |
| 5,102,195 A | | 4/1992 | Axelson et al. | |
| 5,110,173 A | * | 5/1992 | Megna | 296/65.08 |
| 5,149,246 A | * | 9/1992 | Dorn | 414/541 |
| 5,154,563 A | | 10/1992 | Phillips | |
| 5,160,236 A | | 11/1992 | Redding et al. | |
| 5,180,275 A | | 1/1993 | Czech et al. | |
| 5,193,633 A | | 3/1993 | Ezenwa | |
| 5,201,377 A | | 4/1993 | Wilson | |
| 5,205,697 A | | 4/1993 | Getty et al. | |
| 5,211,172 A | * | 5/1993 | McGuane et al. | 607/95 |
| 5,261,779 A | | 11/1993 | Goodrich | |
| 5,308,214 A | | 5/1994 | Crain et al. | |
| 5,333,333 A | | 8/1994 | Mah | |
| 5,348,172 A | | 9/1994 | Wilson | |
| 5,375,913 A | | 12/1994 | Blanchard | |
| 5,431,526 A | | 7/1995 | Peterson et al. | |
| 5,456,335 A | | 10/1995 | Kinsey | |
| 5,456,568 A | | 10/1995 | Kirby et al. | |
| 5,459,891 A | | 10/1995 | Reeve et al. | |
| 5,467,813 A | | 11/1995 | Vermaat | |
| 5,502,851 A | | 4/1996 | Costello | |
| 5,520,403 A | | 5/1996 | Bergstrom et al. | |
| 5,540,539 A | | 7/1996 | Wolfman et al. | |
| 5,542,811 A | | 8/1996 | Vartanian | |
| 5,556,163 A | * | 9/1996 | Rogers et al. | 297/330 |
| 5,560,054 A | | 10/1996 | Simon | |
| 5,617,963 A | | 4/1997 | Baziuk et al. | |
| 5,630,638 A | * | 5/1997 | Hirasawa et al. | 296/65.07 |
| 5,639,105 A | | 6/1997 | Summo | |
| 5,649,329 A | | 7/1997 | Horcher et al. | |
| 5,682,630 A | | 11/1997 | Simon | |
| 5,707,103 A | * | 1/1998 | Balk | 297/13 |
| 5,746,563 A | | 5/1998 | Steckler | |
| 5,827,036 A | | 10/1998 | Steffes et al. | |
| 5,845,348 A | | 12/1998 | Dunn et al. | |
| 5,857,832 A | | 1/1999 | Al-Temen et al. | |
| 5,896,602 A | * | 4/1999 | Marblestone | 5/81.1 R |
| 5,987,664 A | | 11/1999 | Somerton et al. | |
| 6,026,523 A | | 2/2000 | Simon et al. | |
| 6,039,402 A | | 3/2000 | Nemoto | |
| 6,042,330 A | | 3/2000 | Egan | |
| 6,223,364 B1 | | 5/2001 | Egan | |
| 6,260,218 B1 | | 7/2001 | Tsuga | |
| 6,283,528 B1 | | 9/2001 | Townsend | |
| 6,289,534 B1 | | 9/2001 | Hakamiun et al. | |
| 6,296,221 B1 | * | 10/2001 | Nadeau | 248/631 |
| 6,367,103 B1 | | 4/2002 | Collins | |
| 6,390,554 B1 | * | 5/2002 | Eakins et al. | 297/317 |
| 6,595,738 B2 | | 7/2003 | Rock et al. | |
| 6,612,615 B1 | | 9/2003 | Dimand | |
| 6,612,802 B2 | | 9/2003 | Egan | |
| 6,682,291 B2 | | 1/2004 | Schatzler et al. | |
| 6,739,642 B1 | | 5/2004 | Egan | |
| 6,820,911 B2 | * | 11/2004 | Furui | 296/65.01 |
| 6,823,541 B2 | | 11/2004 | Egan | |
| 7,182,385 B2 | * | 2/2007 | Christopher | 296/65.15 |
| 7,207,765 B1 | | 4/2007 | Egan | |
| 7,284,944 B1 | | 10/2007 | Schlangen | |
| 7,316,441 B2 | * | 1/2008 | Iwatani et al. | 296/65.12 |
| 7,383,107 B2 | | 6/2008 | Fehr | |
| 7,402,019 B2 | | 7/2008 | Alexander | |
| 7,404,505 B2 | | 7/2008 | Walther | |
| 7,543,876 B1 | | 6/2009 | Egan | |
| 7,621,365 B2 | | 11/2009 | Egan | |
| 7,651,313 B1 | | 1/2010 | Egan | |
| 7,717,005 B2 | * | 5/2010 | Wang | 74/89.32 |
| 7,850,242 B2 | * | 12/2010 | Taguchi et al. | 297/344.24 |
| 7,862,287 B2 | | 1/2011 | Egan | |
| 8,091,945 B2 | * | 1/2012 | Hancock et al. | 296/65.06 |
| 8,696,063 B2 | * | 4/2014 | Rattenbury et al. | 297/256.12 |
| 2004/0066074 A1 | * | 4/2004 | Ovitt | 297/344.21 |
| 2005/0264020 A1 | * | 12/2005 | Egan | 296/63 |
| 2006/0045686 A1 | | 3/2006 | Alexander | |
| 2006/0061178 A1 | * | 3/2006 | Billger et al. | 297/344.22 |
| 2006/0087166 A1 | | 4/2006 | Trippensee et al. | |
| 2006/0182569 A1 | | 8/2006 | Andersson | |
| 2010/0040452 A1 | | 2/2010 | Egan | |
| 2012/0091772 A1 | | 4/2012 | Egan | |

FOREIGN PATENT DOCUMENTS

| | | |
|---|---|---|
| JP | 11-253492 | 9/1999 |
| JP | 2001315565 | 11/2001 |
| JP | 2004195062 | 7/2004 |
| SU | 1484678 A | 6/1989 |

* cited by examiner

COMPACT MULTI-MOTION LIFTING AND TRANSFERRING APPARATUS AND METHOD OF OPERATING SAME

CROSS-REFERENCE TO RELATED APPLICATIONS

This patent application claims priority to U.S. Provisional Patent Application No. 61/344,489, filed Aug. 5, 2010, which is hereby incorporated by reference herein in its entirety.

FIELD OF THE DISCLOSURE

The present disclosure relates generally to devices and methods for lifting and transferring persons into and out of vehicles and, more particularly, to a compact multi-motion lifting and transferring apparatus and a method of operating same for assisting persons when entering and exiting a vehicle.

BACKGROUND OF THE DISCLOSURE

Difficulties are often encountered when transferring disabled persons from one location to another. Particularly in the case of wheelchair-bound persons, it is often quite difficult to lift and transfer such persons to and from their wheelchair from and to, for example, a motor vehicle. One or more persons are usually required to assist the disabled person.

There have been some inventive efforts directed at alleviating the problems associated with transferring disabled persons from one location to another. For example, U.S. Pat. No. 4,365,924 to Brigman et al. discloses a disabled person transfer device for transferring a disabled person from a wheelchair to a vehicle. Also, U.S. Pat. No. 5,459,891 to Reeve et al. discloses a hydraulically powered lift and transport apparatus for lifting and transporting wheelchair bound persons. Further, U.S. Pat. No. 6,223,364 to Egan discloses a multi-motion lifting and transferring apparatus for assisting persons when entering and exiting a vehicle.

Some of the aforementioned patents disclose devices which allow a disabled person to be lifted from a wheelchair or a bed and transferred to another location. However, the devices disclosed in these patents, as well as other known devices, have drawbacks in the areas of cost and complexity which could limit the potential mobility of a disabled individual. For instance, the disabled person transfer device disclosed in U.S. Pat. No. 4,365,924 requires extensive modifications to a vehicle as well as a modified wheelchair for use with the device. Also, the device disclosed in U.S. Pat. No. 6,223,364 is incompatible with the functional and installation requirements of certain combinations of vehicles and users, in particular when a vehicle has a relatively small door opening and structural obstructions in the exit path of the seat, when users require extra legroom and a rearward motion of the seat prior to turning and exit. Further, the lift and transport apparatus disclosed in U.S. Pat. No. 5,459,891 requires a remotely located hydraulic pump and 120 VAC current to power the various components of the apparatus. The Turny turning automotive seat product manufactured by Bruno Corporation in the United States overcomes certain legroom restrictions with a limited rearward motion prior to exiting. However, this product does not overcome many vehicle structures and other obstructions if the seat is exiting the vehicle. Similar drawbacks exist for other known lifting and transferring devices. For example, the lift and transport apparatus disclosed in U.S. Pat. No. 7,862,287 has the disadvantage of a complex set of multiple pivot points, which make it difficult to achieve structural stability while keeping within industry standard lift weight requirements.

The disabled consumer values legroom both for her or himself in front an adapted seat of and for the passenger behind the seat, the ability to recline the adapted seat, and the ability to retain the comfort of a factory seat, particularly without increasing overall height and thus reducing headroom and causing safety concerns in case of an accident. The obvious solution to these concerns is to locate the bulk of the up/down drive mechanism of an adapted seat in a space adjacent to the seat. This presents severe challenges as the design of modern vehicles favors larger seats in smaller vehicles and thus reduces empty space adjacent to the seats available for such a drive mechanism.

In view of the foregoing, it may be understood that there may be significant problems and shortcomings associated with current lifting and transferring apparatuses for assisting persons when entering and exiting a vehicle.

SUMMARY OF THE DISCLOSURE

A compact multi-motion lifting and transferring apparatus and a method of operating same are disclosed. Two primary embodiments of the compact multi-motion lifting and transferring apparatus are disclosed: a base version and a slide tray version. Both embodiments address the problems and shortcomings associated with current lifting and transferring apparatuses in at least part with a unique interlocking design which offers superior strength and rigidity in a small and flexible package. For example, an apparatus in accordance with the present disclosure in the base version may be realized as having a first pivot point for rotating an intermediary support member about a substantially vertical axis, an electrically or hydraulically powered up/down extension arm, a support member which typically supports a seat for accommodating at least one person, and a latching mechanism designed to secure the seat and seat support mechanism in the fully stowed position suitable for traveling in the vehicle. Alternatively, an apparatus in accordance with the present disclosure in the slide tray version may be realized as having a first pivot point for rotating an intermediary support member about a substantially vertical axis, an electrically or hydraulically powered up/down extension arm, a support member which typically supports a seat for accommodating at least one person, a slide tray for incorporating an additional fore/aft motion to accommodate various obstacles and ergonomic considerations presented in modern automobiles when used by persons with disabilities, and a latching mechanism designed to secure the seat and seat support mechanism in the fully stowed position suitable for traveling in the vehicle.

In ordinary operation of the slide tray version, a user may activate a rotate motor causing a lower up/down extension arm assembly, an upper up/down extension arm assembly, a seat support assembly, a slide tray assembly (e.g., for the slide tray version), an up/down drive assembly, and a seat to pivot about a substantially vertical axis around a pivot point until they reach a position substantially rotated to face out of a vehicle. At this point, in the case of the slide tray version, the apparatus may activate the slide tray assembly. At the end of the travel of the slide tray assembly or concurrent with this travel, the apparatus may initiate descent of the upper up/down extension arm assembly, the seat support assembly, the slide tray assembly (e.g., for the slide tray version), the up/down drive assembly, and the seat to a point appropriate for a user to either transfer from the seat or stand and walk. An entry process for the slide tray version may be an inversion of the above-described exit process.

In the case of the base version, after rotation, the apparatus may immediately initiate descent of the upper up/down extension arm assembly, the seat support assembly, the slide tray assembly (e.g., for the slide tray version), the up/down drive assembly, and the seat to a point appropriate for a user to either transfer from the seat or stand and walk. An entry process for the base version may be an inversion of the above-described exit process.

In accordance with further aspects of the present disclosure, in the case of the slide tray version, the slide tray may be secured by a latching mechanism which allows for entry of a latch striker from a rearward direction. It may also provide an intermediary latching position, and incorporate a slot which allows additional travel towards the rear of a vehicle, which can be useful in vehicles with minimal legroom where a user may benefit from an initial rearward motion of the seat to allow leg exit prior to rotation and exit.

In accordance with still further aspects of the present disclosure, the pivot point may be electrically or hydraulically actuated via a rotate motor.

In accordance with still further aspects of the present disclosure, the electrically actuated rotator, the latching device, and the up-down extension arm may comprise an electrical, hydraulic, pneumatic or optical measurement device for aiding a controller to measure and memorize motions.

In accordance with still further aspects of the present disclosure, the latching mechanism may include a release mechanism so as to allow manual operation.

In accordance with still further aspects of the present disclosure, the electrically or hydraulically-actuated rotators and actuators may comprise in their control circuitry a door sensor electrical or optical switch, which may prevent operation of the apparatus when the vehicle door is closed.

In accordance with still further aspects of the present disclosure, the electrically actuated rotators may comprise in their control circuitry electrical current load sensors, which may prevent rotation or up-down motion of the apparatus when a barrier such as a human body part or other obstacle is encountered.

In accordance with still further aspects of the present disclosure, rotation, sliding, and up-down motion may incorporate control circuitry optical sensors or electrical switches, which may prevent rotation of the apparatus when a barrier such as a human body part or other obstacle is encountered in key obstruction areas.

In accordance with still further aspects of the present disclosure, a fore and aft sliding of the seat by means of slide tracks may be incorporated into the exit or entry motion to facilitate seat clearance with interfering vehicle structure, particularly a rocker panel area at a bottom of a door opening. This motion may activated by an electrical extension arm or motor and comprise an electrical or optical rotation measurement device to provide information to an electrical controller.

In accordance with still further aspects of the present disclosure, the electrically actuated rotators and the hydraulically or electrically powered up/down extension arm may be electrically configured to operate from a common control unit. This common control unit may afford the capability of gathering input data provided by electrical or optical movement measurement devices on the electric or hydraulic extension arms and rotation motors, and then remembering this information to repeat precise combinations of motor movements. The common control unit may also comprise for human input a remote control unit, or a hard-wired modular control unit.

In accordance with still further aspects of the present disclosure, one or more of the electrically actuated rotators and the electrical extension arms may include limit switches for preventing excessive movement and/or rotation inward or outward or upwards or downward.

In accordance with still further aspects of the present disclosure, at least one of the electrically actuated rotator and the electrically actuated slide tray may beneficially include a release mechanism so as to allow manual operation. Similarly, the electrically actuated extension arms may beneficially include a mechanical crank so as to allow manual operation.

The disclosed apparatus and method are typically used to transfer disabled persons in and out of vans, trucks, recreational vehicles, and other vehicles, but can also be used to transfer persons and/or things for other purposes.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1A:
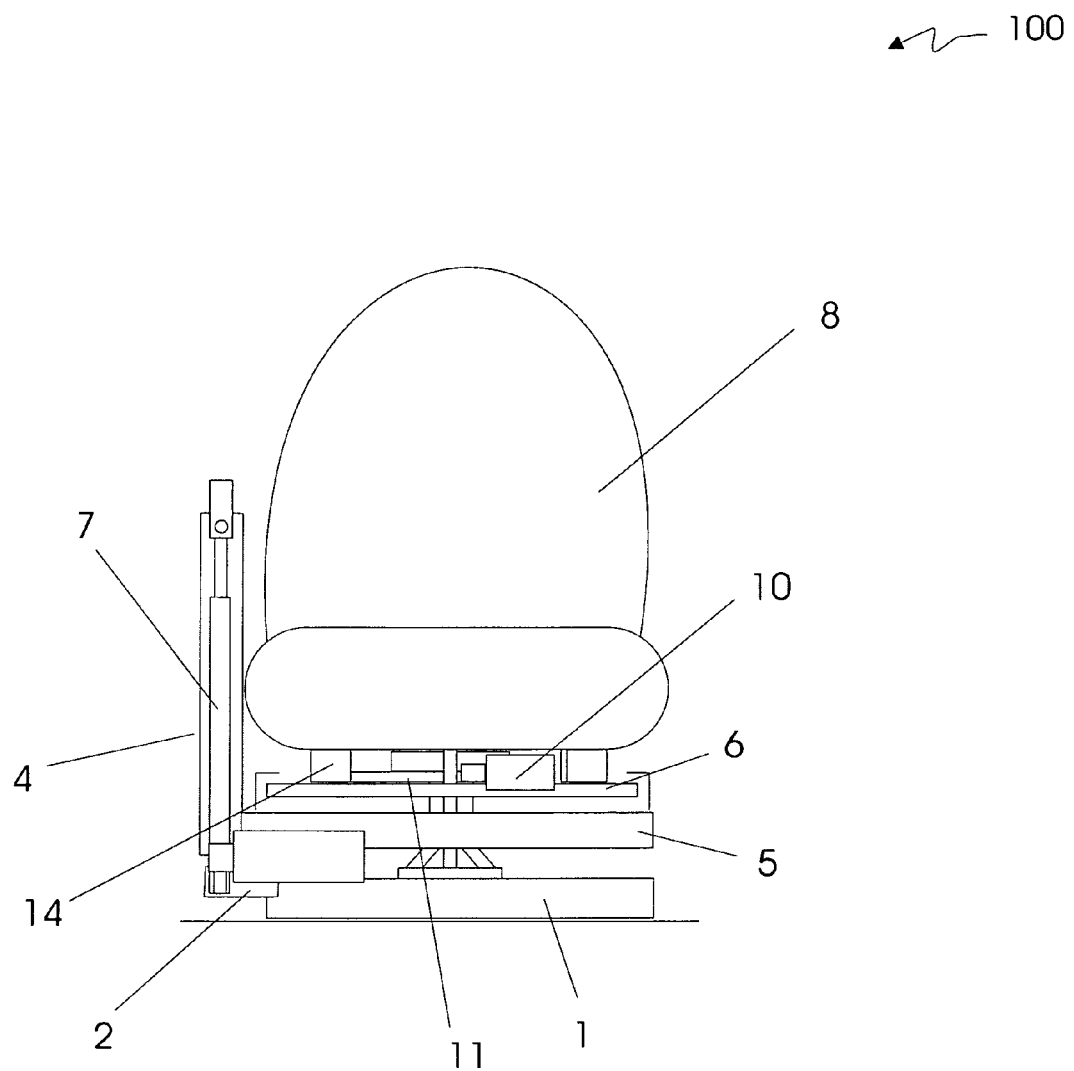
FIG. 1A is a front view of a multi-motion lifting and transferring apparatus in accordance with an embodiment of the present disclosure in the slide tray version with the unit fully retracted, stowed inside the vehicle and forward-facing as it would be in a vehicle when traveling.
Figure 1B:
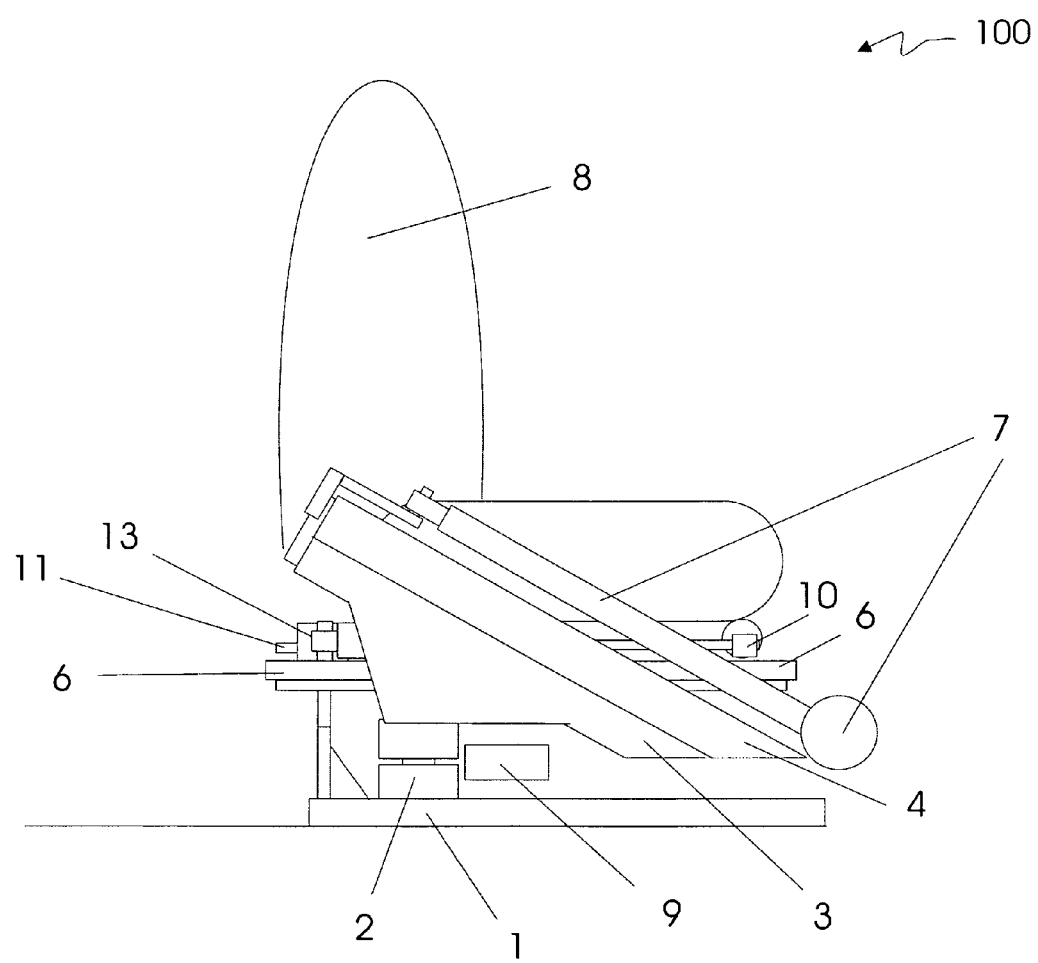
FIG. 1B is a side view of a multi-motion lifting and transferring apparatus shown in FIG. 1A in accordance with an embodiment of the present disclosure in the slide tray version with the unit fully retracted, stowed inside the vehicle and forward-facing as it would be in a vehicle when traveling.
Figure 1C:
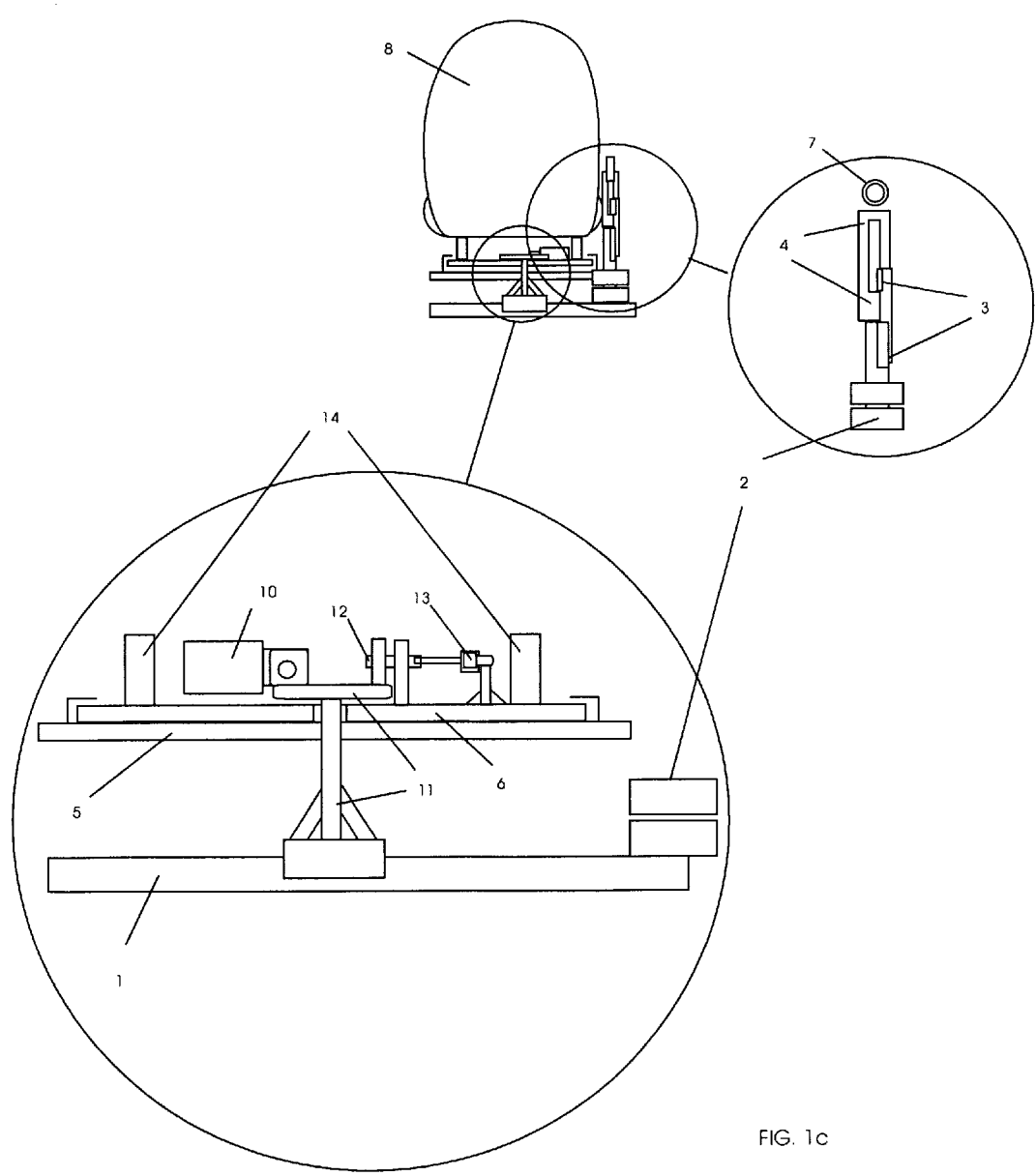
FIG. 1C is a rear view of a multi-motion lifting and transferring apparatus shown in FIG. 1A in accordance with an embodiment of the present disclosure in the slide tray version with the unit fully retracted, stowed inside the vehicle and forward-facing as it would be in a vehicle when traveling. The left detail callout of FIG. 1C shows a detailed rear view of a latch mechanism and slide plate seat mounting assembly. The right detail callout of FIG. 1C shows a detailed view of a pivot point, a lower up/down extension arm assembly, an upper up/down extension arm assembly, and a rearmost end of an up/down drive assembly.
Figure 2:
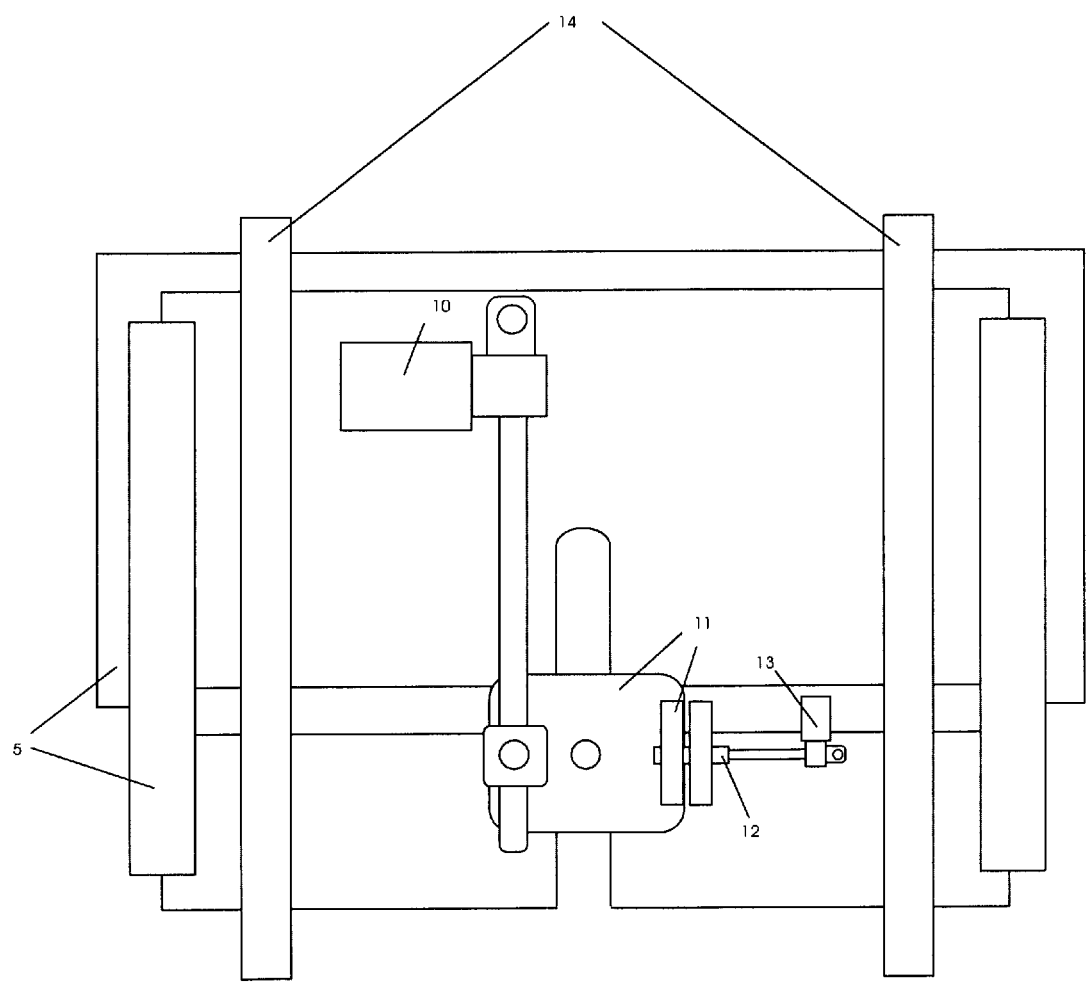
FIG. 2 is a top view of a latch mechanism and slide plate seat mounting assembly of a multi-motion lifting and transferring apparatus in accordance with an embodiment of the present disclosure in the slide tray version with the unit fully retracted and forward-facing as it would be in a vehicle when traveling.

Referring to FIGS. 1A-1C, there is shown a multi-motion lifting and transferring apparatus 100 in accordance with an embodiment of the present disclosure in three respective views, front, side and rear. Beginning from the bottom of the apparatus 100 upward, the apparatus 100 includes a base support plate 1 for securely mounting the apparatus 100 to, for example, the floor of a vehicle or other structure. The apparatus 100 also includes a pivot point 2 allowing lower up/down extension arm assembly 3, upper up/down extension arm assembly 4, seat support assembly 5, slide tray assembly 6, up/down drive assembly 7, and seat 8 to pivot about a substantially vertical axis unless impaired by vehicle structural elements or interference from other apparatus structures.

Lower up/down extension arm assembly 3 supports, interlocks with, and provides a sliding contact surface for upper up/down extension arm assembly 4. Seat support assembly 5 is firmly attached to upper up/down extension arm assembly 4 at its lower end. Upon up/down motion when a user is entering or exiting the vehicle, its interlocking design shown in the right side detail callout of FIG. 1C provides both torsional rigidity for upper up/down extension arm assembly 4 as up/down drive assembly 7 forces it to travel or down the length of its contact surface with lower up/down extension arm assembly 3.

The design of seat support assembly 5 affords a slot designed to receive slide tray assembly 6, allowing it to travel fore and aft relative to the longitudinal axis of the vehicle when the seat is in the fully up and stowed position as shown in FIGS. 1A, 1B, and 1C, and outboard and inboard relative to the vehicle's longitudinal axis when the seat is rotated outward as it would be when the user is boarding the seat or about to transfer off the seat when exiting the vehicle.

Up/down drive assembly 7 is attached at the upper end to lower up/down extension arm assembly 3, and at the lower end to upper up/down extension arm assembly 4. Although FIGS. 1A, 1B, and 1C depict the motor at the lower end of the upper up/down extension arm assembly 4, the motor may be located wherever convenient for the designer or user and is not limited to the shown configuration.

In the slide tray version of the apparatus 100, slide tray drive mechanism 10 is connected at one end to slide tray assembly retainer plate 11 and at the other to slide tray assembly 6. Slide tray assembly retainer plate 11 incorporates a hole which allows latch bolt 12 to firmly lock and engage slide tray assembly 6 and retainer plate 11, thus securing the slide tray 6 and attached seat 8 to base support plate 1 which is attached to the vehicle. Latch bolt 12 may be driven by manual operation or by latch bolt drive mechanism 13. This unique configuration of the slot in slide tray assembly 6, the hole in slide tray assembly retainer plate 11, and latch bolt 12 allow for the advantageous fore-and-aft motion of the seat while exiting and entering in the case of the slide tray version of the apparatus 100. In the base version of the apparatus 100, slide tray assembly 6 may be securely attached to seat support assembly 5 and no fore-aft motion occurs. However, latch bolt 12 may still engage retainer plate 11 as described above.

Seat slide tracks 14 are typically, although not necessarily, OEM manufactured and provide a method of attachment of seat 8 to slide tray assembly 6 as well as afford flexibility in the positioning and comfort of the user when the vehicle is in motion.

During typical operation of the apparatus 100, the seat 8 is initially in the latched position, facing in a forward position with the lower up/down extension arm assembly 3, and upper up/down extension arm assembly 4 fully retracted and substantially parallel to the longitudinal axis of the vehicle. As the exit process begins, latch bolt 12 releases from slide tray assembly retainer plate 11 and, in the case of the slide tray version, the slide tray drive mechanism 10, driven manually or by slide tray drive mechanism 10, may move rearward if the disposition of obstructions within the vehicle makes this necessary, or alternately rotation may immediately commence, whether driven by rotate motor 9 or manually. At this point, lower up/down extension arm assembly 3, upper up/down extension arm assembly 4, seat support assembly 5, slide tray assembly 6, drive assembly 7, seat 8, rotate motor 9, slide tray drive mechanism 10, slide tray assembly retainer plate 11, latch bolt 12, latch bolt drive mechanism 13, seat slide tracks 14 (if present) and seat assembly 8 may begin to rotate in unison about a substantially vertical axis around pivot point 2 toward the vehicle's door opening. Once full rotation has been achieved and the seat is facing a substantially outward direction, the slide tray assembly 6, actuated manually or driven by slide tray drive mechanism 10, may optionally reposition the seat to clear obstacles inside or outside of the vehicle, and then the combination of lower up/down extension arm assembly 3 and upper up/down extension arm assembly 4, driven manually or by up/down drive assembly 7, may extend to lower the user to a comfortable wheelchair transfer or walking height. The entry process may simply be a reverse of the above.

In an electrical controller unit equipped version of apparatus 100, the unit can be programmed for specific sequences of motions or concurrent motions of rotate motor 9, slide tray drive mechanism 10, latch bolt drive mechanism 13, and up/down drive assembly 7 based on information from motion-measuring input mechanisms attached to various points on the apparatus 100. The electrical controller unit equipped version of apparatus 100 may also learn specific motions or series of motions from these same motion-measuring input mechanisms, allowing for one-button operation of a control switch, which can initiate a complex series of concurrent and sequential motions.

In ordinary operation of the slide tray version, the user may activate rotate motor 9, causing lower up/down extension arm assembly 3, upper up/down extension arm assembly 4, seat support assembly 5, slide tray assembly 6 (e.g., for the slide tray version), up/down drive assembly 7, and seat 8 to pivot about a substantially vertical axis around pivot point 2 until they reach a position substantially rotated to face out of the vehicle. At this point, in the case of the slide tray version, the apparatus 100 may activate slide tray assembly 6. At the end of the travel of slide tray assembly 6 or concurrent with this travel, the apparatus 100 may initiate descent of upper up/down extension arm assembly 4, seat support assembly 5, slide tray assembly 6 (e.g., for the slide tray version), up/down drive assembly 7, and seat 8 to a point appropriate for a user to either transfer from the seat or stand and walk. The entry process may be an inversion of the above-described exit process. In the case of the base version, after rotation the apparatus 100 may immediately initiate descent of upper up/down extension arm assembly 4, seat support assembly 5, slide tray assembly 6 (e.g., for the slide tray version), up/down drive assembly 7, and seat 8 to a point appropriate for a user to either transfer from the seat or stand and walk. The entry process for the base version may be an inversion of the above-described exit process.

In the case of the slide tray version, the slide tray 6 may be secured by a latching mechanism which allows for entry of latch striker 8 from a rearward direction. It may also provide an intermediary latching position, and incorporates a slot which allows additional travel towards the rear of the vehicle which may be useful in vehicles with minimal legroom where the user would benefit from an initial rearward motion of seat 8 to allow leg exit prior to rotation and exit. The pivot point 2 may be electrically or hydraulically actuated via rotate motor 9.

The base version may be identical to the slide tray version of the apparatus 100, except that in the case of the base version the slide tray 5 may be firmly attached to the seat support assembly 6, and the slide tray drive mechanism 7 is not present.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A compact multi-motion lifting and transferring apparatus comprising:
   a base support configured to directly non-pivotally attach to a vehicle;
   an extension arm assembly directly pivotally attached to the base support, the extension arm assembly configured to rotate about a single substantially vertical axis coinciding with the direct pivotal attachment to the base support;
   a seat assembly directly non-pivotally attached to the extension arm assembly, the seat assembly configured to support a seat for accommodating at least one person; and
   a latching mechanism configured to secure the seat assembly to the base support when the apparatus is in a fully stowed position interior of the vehicle;
   wherein the extension arm assembly comprises interlocking extension arms having mating contact surfaces disposed at an acute angle with respect to the substantially vertical axis, and wherein the extension arm assembly is further configured to raise and lower the seat assembly between positions interior and exterior of the vehicle by sliding the interlocking extension arms relatively along the mating contact surfaces.

2. The apparatus of claim 1, wherein at least a first portion of the latching mechanism is secured to the base support.

3. The apparatus of claim 2, wherein at least a second portion of the latching mechanism is secured to the seat assembly.

4. The apparatus of claim 3, wherein the latching mechanism comprises a release mechanism to allow alternate manual operation of the apparatus.

5. The apparatus of claim 1, wherein the base support is configured to attach to a floor of the vehicle.

6. The apparatus of claim 1, wherein the extension arm assembly is an electrically actuated up/down extension arm assembly.

7. The apparatus of claim 1, wherein the extension arm assembly is a hydraulically actuated up/down extension arm assembly.

8. The apparatus of claim 1, wherein the extension arm assembly comprises:
   a first extension arm pivotally attached to the base support;
   a second extension arm attached to the seat assembly; and
   a drive assembly attached to the first extension arm and the second extension arm, wherein the drive assembly is configured to force the second extension arm to move with respect to the first extension arm.

9. The apparatus of claim 8, wherein the first extension arm has a first contact surface, wherein the second extension arm has a second contact surface, and wherein the drive assembly is configured to force the second contact surface to slide against the first contact surface.

10. The apparatus of claim 9, wherein the first extension arm supports and interlocks with the second extension arm along the first contact surface and the second contact surface.

11. The apparatus of claim 1, wherein the extension arm assembly is rotated by an electrically actuated rotator.

12. The apparatus of claim 1, wherein the extension arm assembly is rotated by a hydraulically actuated rotator.

13. The apparatus of claim 1, further comprising:
   a controller for controlling movement of the extension arm assembly; and
   a measurement device for measuring and storing positions associated with the controlled movement of the extension arm assembly.

14. The apparatus of claim 13, further comprising:
   at least one sensor for preventing controlled movement of the extension arm assembly during certain conditions.

15. A compact multi-motion lifting and transferring apparatus comprising:
   a base support configured to directly non-pivotally attach to a vehicle;
   an extension arm assembly directly pivotally attached to the base support, the extension arm assembly configured to rotate about a single substantially vertical axis coinciding with the direct pivotal attachment to the base support;
   a seat assembly directly non-pivotally attached to the extension arm assembly;
   a slide tray assembly slideably attached to the seat assembly, the slide tray assembly configured to support a seat for accommodating at least one person;
   a latching mechanism configured to secure the seat assembly to the base support when the apparatus is in a fully stowed position interior of the vehicle;
   wherein the extension arm assembly comprises interlocking extension arms having mating contact surfaces disposed at an acute angle with respect to the substantially vertical axis, and wherein the extension arm assembly is further configured to raise and lower the seat assembly between positions interior and exterior of the vehicle by sliding the interlocking extension arms relatively along the mating contact surfaces.

16. The apparatus of claim 15, wherein the slide tray assembly is an electrically actuated fore/aft slide tray assembly.

17. The apparatus of claim 15, wherein the slide tray assembly is a hydraulically actuated fore/aft slide tray assembly.

18. The apparatus of claim 15, wherein the slide tray assembly comprises:
   a slide tray slideably attached to the seat assembly;
   seat attachment means attached to the slide tray for securing the seat; and
   a drive assembly attached to the slide tray and a retainer mechanism, wherein the drive assembly is configured to force the slide tray to move with respect to the retainer mechanism to permit fore/aft movement of the seat with respect to the seat assembly.

19. The apparatus of claim 18, wherein the retainer mechanism comprises a release mechanism to allow alternate manual operation of the slide tray assembly.

* * * * *